US009098423B2

(12) United States Patent
Cho

(10) Patent No.: US 9,098,423 B2
(45) Date of Patent: Aug. 4, 2015

(54) CROSS-BOUNDARY HYBRID AND DYNAMIC STORAGE AND MEMORY CONTEXT-AWARE CACHE SYSTEM

(75) Inventor: Byungcheol Cho, Seochogu (KR)

(73) Assignee: Taejin Info Tech Co., Ltd., Seoul (KR)

( * ) Notice: Subject to any disclaimer, the term of this patent is extended or adjusted under 35 U.S.C. 154(b) by 251 days.

(21) Appl. No.: 13/253,126

(22) Filed: Oct. 5, 2011

(65) Prior Publication Data

US 2013/0091319 A1    Apr. 11, 2013

(51) Int. Cl.
*G06F 12/08* (2006.01)
*G06F 9/28* (2006.01)
*G06F 11/34* (2006.01)
*G06F 11/14* (2006.01)

(52) U.S. Cl.
CPC ........ *G06F 12/0888* (2013.01); *G06F 11/1441* (2013.01); *G06F 11/3485* (2013.01); *G06F 11/3433* (2013.01); *G06F 2201/885* (2013.01)

(58) Field of Classification Search
CPC .................. G06F 12/0897; G06F 2212/3042; G06F 12/0888; G06F 12/0868; G06F 2212/284; G06F 3/067; G06F 2212/214; G06F 3/0631; G06F 3/0659
See application file for complete search history.

(56) References Cited

U.S. PATENT DOCUMENTS 3,974,479 A * 8/1976 Kotok et al. .................. 711/167
8,464,001 B1 * 6/2013 Edmondson et al. ......... 711/133
2004/0117441 A1 6/2004 Liu et al.
2005/0240745 A1 * 10/2005 Iyer et al. ...................... 711/167
2006/0004957 A1 1/2006 Hand, III et al.
2006/0265558 A1 * 11/2006 Fujino ........................... 711/158
2008/0114924 A1 5/2008 Frayer
2009/0182835 A1 7/2009 Aviles et al.
2010/0235579 A1 9/2010 Biles et al.
2010/0312967 A1 12/2010 Kasai et al.
2011/0191523 A1 * 8/2011 Caulkins ....................... 711/103
2011/0302365 A1 12/2011 Heo et al.

FOREIGN PATENT DOCUMENTS

JP        2005-539309 A    12/2005
KR       10-1023883 B1      3/2011
WO    WO-2013/051860 A1    4/2013

OTHER PUBLICATIONS

International Search Report in International Application No. PCT/KR2012/008040, filed Oct. 4, 2012.
Notice of Allowance dated Oct. 27, 2014 in Korean Application No. 10-2012-0110024.

* cited by examiner

*Primary Examiner* — Cheng-Yuan Tseng
*Assistant Examiner* — Candice Rankin
(74) *Attorney, Agent, or Firm* — Saliwanchik, Lloyd & Eisenschenk

(57) ABSTRACT

Embodiments of the present invention provide an adaptive cache system and an adaptive cache system for a hybrid storage system. Specifically, in a typical embodiment, an input/out (I/O) traffic analysis component is provided for monitoring data traffic and providing a traffic analysis based thereon. An adaptive cache algorithm component is coupled to the I/O traffic analysis component for applying a set of algorithms to determine a storage schema for handling the data traffic. Further, an adaptive cache policy component is coupled to the adaptive cache algorithm component.

15 Claims, 5 Drawing Sheets

CROSS-BOUNDARY HYBRID AND DYNAMIC STORAGE AND MEMORY CONTEXT-AWARE CACHE SYSTEM

CROSS-REFERENCE TO RELATED APPLICATION

This application is related in some aspects to commonly-owned, co-pending application Ser. No. 12/758,937, entitled "SEMICONDUCTOR STORAGE DEVICE", filed on Apr. 13, 2010, the entire contents of which are herein incorporated by reference. This application is also related in some aspects to commonly-owned, co-pending application Ser. No. 12/816,508 entitled SEMICONDUCTOR STORAGE DEVICE BASED CACHE MANAGER", filed on Jun. 16, 2010, the entire contents of which are herein incorporated by reference. This application is also related in some aspects to commonly-owned, co-pending application Ser. No. 13/073,447 entitled ADAPTIVE CACHE FOR A SEMICONDUCTOR STORAGE DEVICE-BASED SYSTEM", filed on Mar. 28, 2011, the entire contents of which are herein incorporated by reference.

FIELD OF THE INVENTION

The present invention relates to a semiconductor storage device (SSD) of a PCI-Express (PCI-e) type. Specifically, the present invention relates to an SSD-based cache system.

BACKGROUND OF THE INVENTION

As the need for more computer storage grows, more efficient solutions are being sought. As is known, there are various hard disk solutions that store/read data in a mechanical manner as a data storage medium. Unfortunately, data processing speed associated with hard disks is often slow. Moreover, existing solutions still use interfaces that cannot catch up with the data processing speed of memory disks having high speed data input/output performance as an interface between the data storage medium and the host. Therefore, there is a problem in the existing area in that the performance of the memory disk cannot be property utilized.

SUMMARY OF THE INVENTION

Embodiments of the present invention provide an adaptive cache system and an adaptive cache system for a hybrid storage system. Specifically, in a typical embodiment, an input/out (I/O) traffic analysis component is provided for monitoring data traffic and providing a traffic analysis based thereon. An adaptive cache algorithm component is coupled to the I/O traffic analysis component for applying a set of algorithms to determine a storage schema for handling the data traffic. Further, an adaptive cache policy component is coupled to the adaptive cache algorithm component. The adaptive cache policy component applies a set of caching policies and makes storage determinations based on the traffic analysis and the storage schema. Based on the storage determinations, data traffic can be stored (e.g., cached) among a set of storage devices coupled to the adaptive cache policy component. Such storage components can include: a low-mid-high cache solution, a low speed storage component (e.g., a high density drive (HDD), flash memory unit, etc.), a middle speed storage component (PRAM, FRAM, MRAM SSD, etc.), and a high speed storage component (e.g., a DRAM SSD). The high speed storage component itself can comprise a cache area, a high speed storage area, and a storage manager.

A first aspect of the present invention provides an adaptive cache system for a hybrid storage system, comprising: an input/out (I/O) traffic analysis component for monitoring data traffic and providing a traffic analysis based thereon; an adaptive cache algorithm component coupled to the I/O traffic analysis component for applying a set of algorithms to determine a storage schema for handling the data traffic; an adaptive cache policy component coupled to the adaptive cache algorithm component for applying a set of caching policies and making storage determinations based on the traffic analysis and the storage schema; a low-mid-high cache coupled to the adaptive cache policy component for storing the data traffic based on the storage determinations; and a high speed storage component coupled to the low-mid-high cache.

A second aspect of the present invention provides an adaptive cache system for a hybrid storage system, comprising: an input/out (I/O) traffic analysis component for monitoring data traffic and providing a traffic analysis based thereon; an adaptive cache algorithm component coupled to the I/O traffic analysis component for applying a set of algorithms to determine a storage schema for handling the data traffic; an adaptive cache policy component coupled to the adaptive cache algorithm component for applying a set of caching policies and making storage determinations based on the traffic analysis and the storage schema; a low-mid-high cache coupled to the adaptive cache policy component for storing the data traffic based on the storage determinations; a low speed storage component coupled to the low-mid-high cache; and a high speed storage component coupled to the low-mid-high cache, the high speed storage component comprising a cache area, a high speed storage area, and a storage manager for controlling the cache area and the high speed storage area.

A third aspect of the present invention provides a method for forming an adaptive cache system for a hybrid storage system, comprising: providing an input/out (I/O) traffic analysis component for monitoring data traffic and providing a traffic analysis based thereon; coupling an adaptive cache algorithm component for applying a set of algorithms to determine a storage schema for handling a data traffic to the I/O traffic analysis component; coupling an adaptive cache policy component to the adaptive cache algorithm component for applying a set of caching policies and making storage determinations based on the traffic analysis and the storage schema; coupling a low-mid-high cache to the adaptive cache policy component for storing the data traffic based on the storage determinations; coupling a low speed storage component to the low-mid-high cache; and coupling a high speed storage component to the low-mid-high cache, the high speed storage component comprising a cache area, a high speed storage area, and a storage manager for controlling the cache area and the high speed storage area.

BRIEF DESCRIPTION OF THE DRAWINGS

These and other features of this invention will be more readily understood from the following detailed description of the various aspects of the invention taken in conjunction with the accompanying drawings in which.

Figure 1:
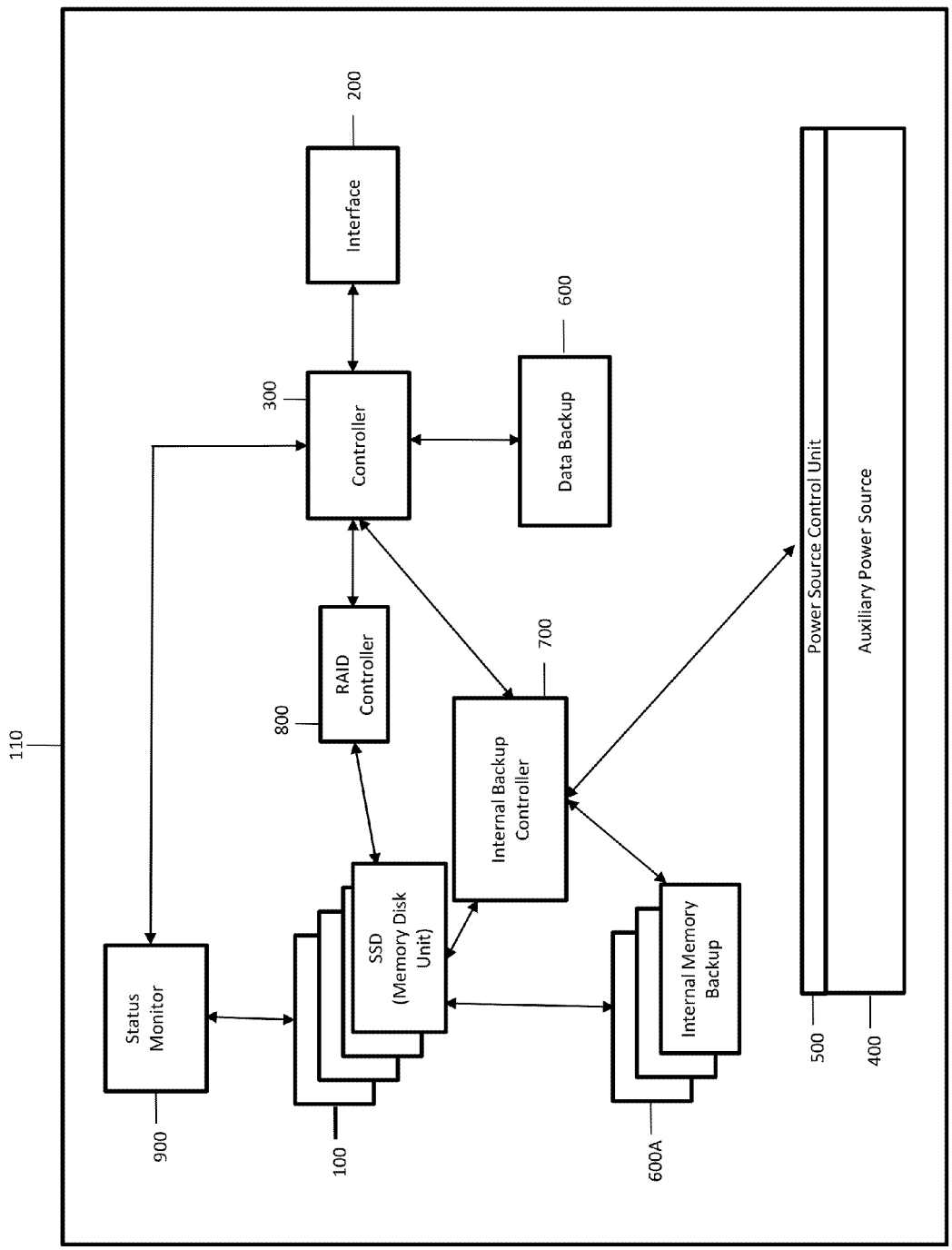
FIG. 1 is a diagram illustrating a configuration of a storage device of a PCI-Express (PCI-e) type according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Exemplary embodiments will now be described more fully herein with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limited to this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof. Moreover, as used herein, the term RAID means redundant array of independent disks (originally redundant array of inexpensive disks). In general, RAID technology is a way of storing the same data in different places (thus, redundantly) on multiple hard disks. By placing data on multiple disks, I/O (input/output) operations can overlap in a balanced way, improving performance. Since multiple disks increase the mean time between failures (MTBF), storing data redundantly also increases fault tolerance.

Unless otherwise defined, all terms (including technical and scientific terms) used herein have the same meaning as commonly understood by one of ordinary skill in the art. It will be further understood that terms such as those defined in commonly used dictionaries should be interpreted as having a meaning that is consistent with their meaning in the context of the relevant art and the present disclosure, and will not be interpreted in an idealized or overly formal sense unless expressly so defined herein. For example: PRAM is intended to mean parameter random access memory; FRAM is intended to mean ferroelectric random access memory; and MRAM is intended to mean magnetoresistive random access memory Hereinafter, a storage device of a PCI-Express (PCI-e) type according to an embodiment will be described in detail with reference to the accompanying drawings.

Embodiments of the present invention provide an adaptive cache system and an adaptive cache system for a hybrid storage system. Specifically, in a typical embodiment, an input/out (I/O) traffic analysis component is provided for monitoring data traffic and providing a traffic analysis based thereon. An adaptive cache algorithm component is coupled to the I/O traffic analysis component for applying a set of algorithms to determine a storage schema for handling the data traffic. Further, an adaptive cache policy component is coupled to the adaptive cache algorithm component. The adaptive cache policy component applies a set of caching policies and makes storage determinations based on the traffic analysis and the storage schema. Based on the storage determinations, data traffic can be stored (e.g., cached) among a set of storage devices coupled to the adaptive cache policy component. Such storage components can include: a low-mid-high cache solution, a low speed storage component (e.g., a high density drive (HDD), flash memory unit, etc.), a middle speed storage component (PRAM, FRAM, MRAM SSD, etc.), and a high speed storage component (e.g., a DRAM SSD). The high speed storage component itself can comprise a cache area, a high speed storage area, and a storage manager.

The storage device of a PCI-Express (PCI-e) type supports a low speed data processing speed for a host by adjusting synchronization of a data signal transmitted/received between the host and a memory disk during data communications between the host and the memory disk through a periphery interface such as a PCI-Express interface, and simultaneously supports a high speed data processing speed for the memory disk, thereby supporting the performance of the memory to enable high speed data processing in an existing interface environment at the maximum. It is understood in advance that although PCI-Express technology will be utilized in a typical embodiment, other alternatives are possible. For example, the present invention could utilize Serial Attached Small Computer System Interface (SAS)/Serial Advanced Technology Advancement (SATA) technology in which a SAS/SATA type storage device is provided that utilizes a SAS/SATA interface Referring now to FIG. 1, a diagram schematically illustrating a configuration of a PCI-Express type, RAID controlled semiconductor storage device (e.g., for providing storage for a serially attached computer device) according to an embodiment of the invention is shown. As depicted, FIG. 1 shows a RAID controlled PCI-Express type storage device 110 according to an embodiment of the invention which includes a SSD memory disk unit 100 (referred to herein as SSD memory disk unit, SSD, and/or SSD memory disk unit) comprising: a plurality of memory disks having a plurality of volatile semiconductor memories/memory units (also referred to herein as high speed SSD memory disk units 100); a RAID controller 800 coupled to SSD memory disk units 100; an interface unit 200 (e.g., PCI-Express host) which interfaces between the SSD memory disk unit and a host; a controller unit 300; an auxiliary power source unit 400 that is charged to maintain a predetermined power using the power transferred from the host through the PCI-Express host interface unit; a power source control unit 500 that supplies the power transferred from the host through the PCI-Express host interface unit to the controller unit 300, the SSD memory disk units 100, the backup storage unit, and the backup control unit which, when the power transferred from the host through the PCI-Express host interface unit is blocked or an error occurs in the power transferred from the host, receives power from the auxiliary power source unit and supplies the power to the SSD memory disk unit through the controller unit; a backup storage unit 600A-B that stores data of the SSD memory disk unit; and a backup control unit 700 that backs up data stored in the SSD memory disk unit in the backup storage unit, according to an instruction from the host or when an error occurs in the power transmitted from the host; and a redundant array of independent disks (RAID) controller 800 coupled to SSD memory disk unit 100, controller 300, and internal backup controller 700.

The SSD memory disk unit 100 includes a plurality of memory disks provided with a plurality of volatile semiconductor memories for high speed data input/output (for example, DDR, DDR2, DDR3, SDRAM, and the like), and inputs and outputs data according to the control of the controller 300. The SSD memory disk unit 100 may have a configuration in which the memory disks are arrayed in parallel.

The PCI-Express host interface unit 200 interfaces between a host and the SSD memory disk unit 100. The host may be a computer system or the like, which is provided with a PCI-Express interface and a power source supply device.

The controller unit 300 adjusts synchronization of data signals transmitted/received between the PCI-Express host interface unit 200 and the SSD memory disk unit 100 to control a data transmission/reception speed between the PCI-Express host interface unit 200 and the SSD memory disk unit 100.

As depicted, a PCI-e type RAID controller 800 can be directly coupled to any quantity of SSD memory disk units 100. Among other things, this allows for optimum control of SSD memory disk units 100. Among other things, the use of a RAID controller 800:

1. Supports the current backup/restore operations.
2. Provides additional and improved backup function by performing the following:
   a) the internal backup controller 700 determines the backup (user's request order or the status monitor detects power supply problems);
   b) the internal backup controller 700 requests a data backup to SSD memory disk units;
   c) the internal backup controller 700 requests internal backup device to backup data immediately;
   d) the internal backup controller 700 monitors the status of the backup for the SSD memory disk units and internal backup controller; and
   e) the internal backup controller 700 reports the internal backup controller's status and end-op.
3. Provides additional and improved restore function by performing the following:
   a) the internal backup controller 700 determines the restore (user's request order or the status monitor detects power supply problems);
   b) the internal backup controller 700 requests a data restore to the SSD memory disk units;
   c) the internal backup controller 700 requests an internal backup device to restore data immediately;
   d) the internal backup controller 700 monitors the status of the restore for the SSD memory disk units and internal backup controller; and
   e) the internal backup controller 700 reports the internal backup controller status and end-op.

Figure 2:
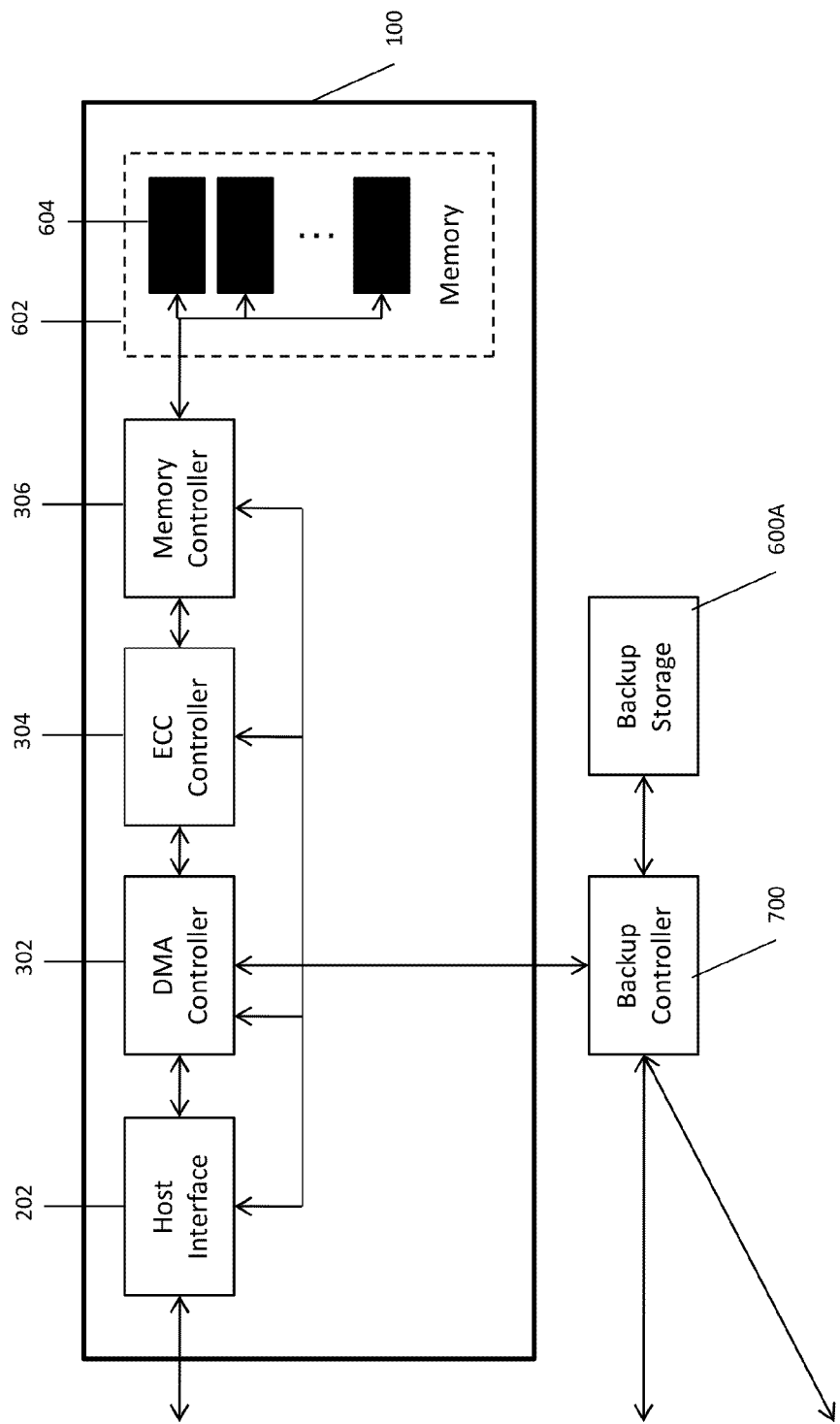
FIG. 2 is a diagram of the high speed SSD of FIG. 1 according to an embodiment of the present invention.

Referring now to FIG. 2, a diagram schematically illustrating a configuration of the high speed SSD 100 is shown. As depicted, SSD memory disk unit 100 comprises: a host interface 202 (e.g., PCI-Express host) (which can be interface 200 of FIG. 1, or a separate interface as shown); a Direct Memory Access (DMA) controller 302 interfacing with a backup control module 700; an ECC controller 304; and a memory controller 306 for controlling one or more blocks 604 of memory 602 that are used as high speed storage. Also shown are backup controller 700 coupled to DMA controller and backup storage unit 600A coupled to backup controller 700.

In general, DMA is a feature of modern computers and microprocessors that allows certain hardware subsystems within the computer to access system memory for reading and/or writing independently of the central processing unit. Many hardware systems use DMA including disk drive controllers, graphics cards, network cards, and sound cards. DMA is also used for intra-chip data transfer in multi-core processors, especially in multiprocessor system-on-chips, where its processing element is equipped with a local memory (often called scratchpad memory) and DMA is used for transferring data between the local memory and the main memory. Computers that have DMA channels can transfer data to and from devices with much less CPU overhead than computers without a DMA channel. Similarly, a processing element inside a multi-core processor can transfer data to and from its local memory without occupying its processor time and allowing computation and data transfer concurrency.

Without DMA, using programmed input/output (PIO) mode for communication with peripheral devices, or load/store instructions in the case of multi-core chips, the CPU is typically fully occupied for the entire duration of the read or write operation, and is thus unavailable to perform other work. With DMA, the CPU would initiate the transfer, do other operations while the transfer is in progress, and receive an interrupt from the DMA controller once the operation has been done. This is especially useful in real-time computing applications where not stalling behind concurrent operations is critical.

Figure 3:
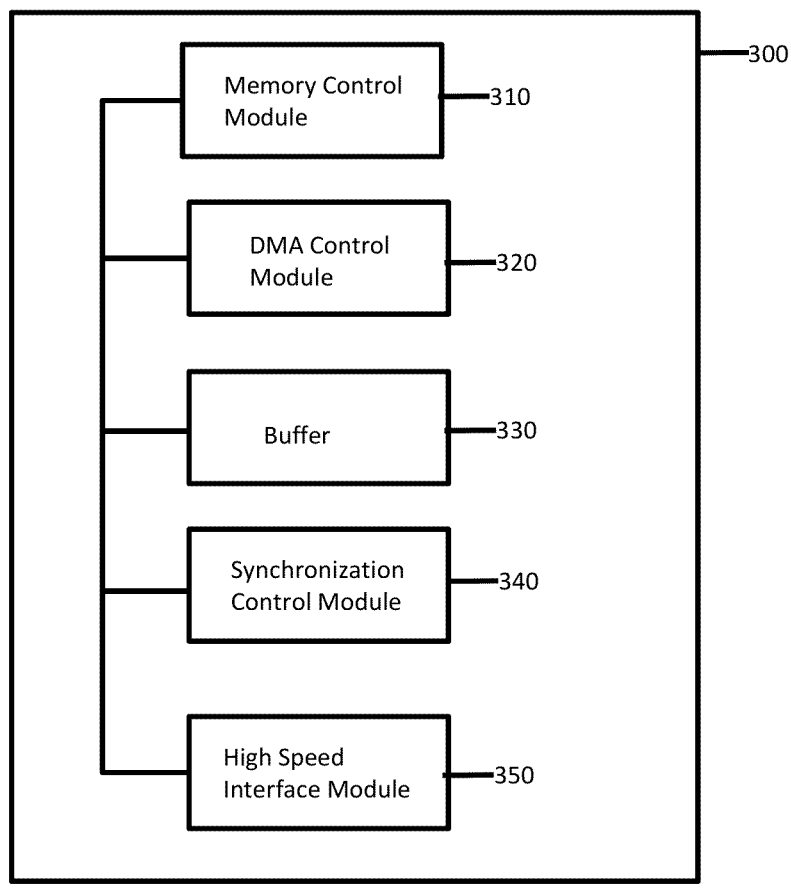
FIG. 3 is a diagram illustrating a configuration of a controller unit in FIG. 1 according to an embodiment of the present invention.

Referring now to FIG. 3, the controller unit 300 of FIG. 1 is shown as comprising: a memory control module 310 which controls data input/output of the SSD memory disk unit 100; a DMA control module 320 which controls the memory control module 310 to store the data in the SSD memory disk unit 100, or reads data from the SSD memory disk unit 100 to provide the data to the host, according to an instruction from the host received through the PCI-Express host interface unit 200; a buffer 330 which buffers data according to the control of the DMA control module 320; a synchronization control module 340 which, when receiving a data signal corresponding to the data read from the SSD memory disk unit 100 by the control of the DMA control module 320 through the DMA control module 320 and the memory control module 310, adjusts synchronization of a data signal so as to have a communication speed corresponding to a PCI-Express communications protocol to transmit the synchronized data signal to the PCI-Express host interface unit 200, and when receiving a data signal from the host through the PCI-Express host interface unit 200, adjusts synchronization of the data signal so as to have a transmission speed corresponding to a communications protocol (for example, PCI, PCI-x, or PCI-e, and the like) used by the SSD memory disk unit 100 to transmit the synchronized data signal to the SSD memory disk unit 100 through the DMA control module 320 and the memory control module 310; and a high speed interface module 350 which processes the data transmitted/received between the synchronization control module 340 and the DMA control module 320 at high speed. Here, the high speed interface module 350 includes a buffer having a double buffer structure and a buffer having a circular queue structure, and processes the data transmitted/received between the synchronization control module 340 and the DMA control module 320 without loss at high speed by buffering the data and adjusting data clocks.

Figure 4:
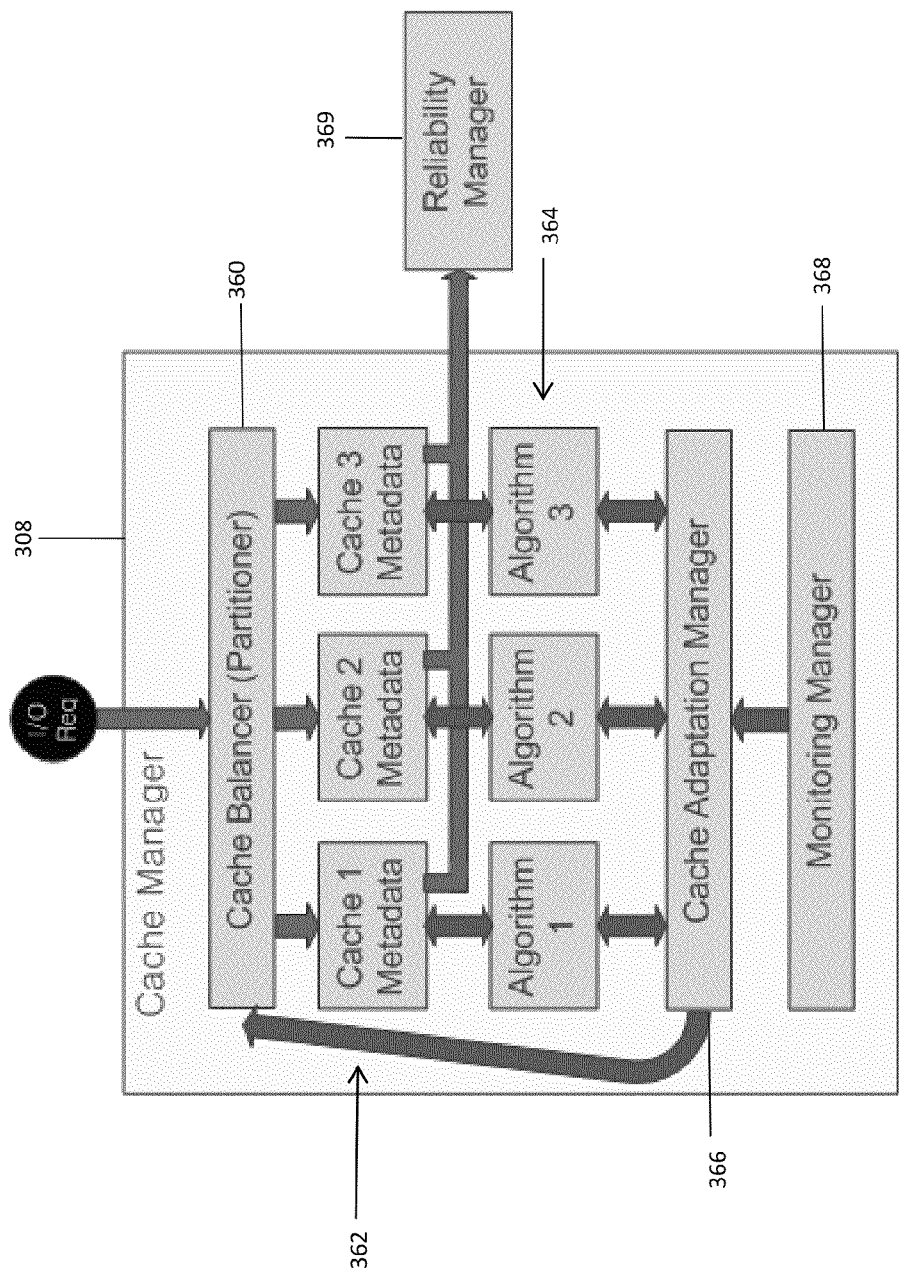
FIG. 4 is a diagram of a cache manager according an embodiment of the present invention.

Referring now to FIG. 4, a SSD based cache manager 308 according to the present invention is shown. As shown, a cache balancer 360 is coupled to a set of cache meta data units 362. A set of cache algorithms 364 utilizes the set of cache meta data units to determine optimal data caching operations. A cache adaptation manger 366 is coupled to and sends volume information to the cache balancer 360. Typically, this information is computed using the set of cache algorithms. A monitoring manager 368 is coupled to the cache adaptation manager 366. Also shown is a reliability manager 369 that receives the cache meta data units 362.

In a typical embodiment, the following functions are performed:
  Cache balancer 360 balances a load across the SSD based cache manager 308;
  Cache adaptation manager 366 sends volume information to the cache balancer 360;
  Monitoring manager 368 collects data patterns and sends the data patterns to the cache balancer 360;
  SSD cache manager 308 is useable being used as a buffer cache.
  Set of algorithms 364 enables autonomic reconfiguration of the SSD based cache manager.
  Set of cache algorithms 364 are configured to run independently.

Figure 5:
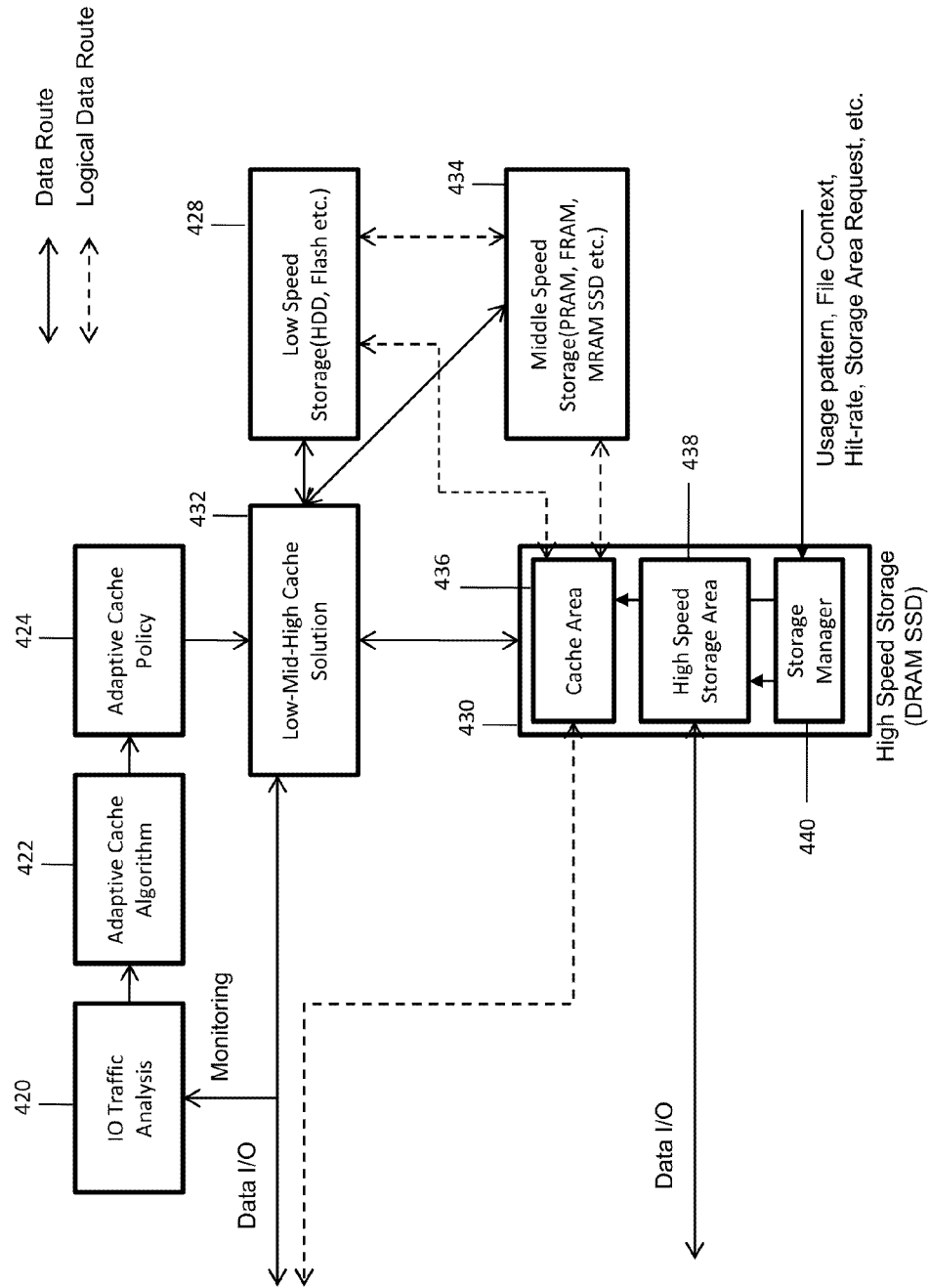
FIG. 5 is a diagram an adaptive cache system for a hybrid storage system according to an embodiment of the present invention.

Referring to FIG. 5, an adaptive cache system for a hybrid storage system (e.g., as managed by and/or implemented in conjunction with cache manager 308 of FIG. 4) according to an embodiment of the present invention is shown. As shown, the system comprises a low-medium (mid)-high speed cache component 432 coupled to a low speed storage component 428 (e.g., high density drive (HDD), flash memory, etc.), a high speed storage component 430 (e.g., dynamic random access memory (DRAM), semiconductor storage device (SSD), etc.), and a middle speed storage component 434 (e.g., parameter random access memory (PRAM), ferroelectric random access memory (FRAM), magnetoresistive random access memory (MRAM), or a semiconductor storage device (SSD), etc.). As further shown, the system comprises: an input/out (I/O) traffic analysis component 420 for analyzing/monitoring data traffic being received, and an adaptive cache algorithm component 422 for applying a set of algorithms to determine the manner and location (i.e., a schema) in which data received should be cached. In general, the set of algorithms will be applied using analysis results from I/O traffic analysis component. Still yet, an adaptive cache policy component 424 can be provided for applying caching policies and making storage determinations based on the traffic analysis and/or results of cache algorithm computation(s). Once algorithm(s) and policies have been applied, data can be communicated to low-mid-high cache component 432 for caching and/or storage in low speed storage component 428, middle speed storage component 434 and/or high speed storage component 430 (e.g., a DRAM SSD memory disk unit). As shown, high speed storage component comprises cache area 430, high speed storage area 438, and storage manager 440.

Under this embodiment, the cache is divided into a high speed cache area 438 and a common storage area. Storage manager 440 typically controls both areas based on usage patterns, file contexts, hit-rates, storage area request, etc. As further shown, two data input (I/O) paths are also provided that allow cache area 436 and the high speed storage area 438 to operate independently. Such an implementation provides: increased cache usage and size; faster data access times (e.g., because the high-speed data will be treated in separately/independently; and/or the size of the storage area to be optimized based on the usage data Referring back to FIG. 1, auxiliary power source unit 400 may be configured as a rechargeable battery or the like, so that it is normally charged to maintain a predetermined power using power transferred from the host through the PCI-Express host interface unit 200 and supplies the charged power to the power source control unit 500 according to the control of the power source control unit 500.

The power source control unit 500 supplies the power transferred from the host through the PCI-Express host interface unit 200 to the controller unit 300, the SSD memory disk unit 100, the backup storage unit 600A-B, and the backup control unit 700.

In addition, when an error occurs in a power source of the host because the power transmitted from the host through the PCI-Express host interface unit 200 is blocked, or the power transmitted from the host deviates from a threshold value, the power source control unit 500 receives power from the auxiliary power source unit 400 and supplies the power to the SSD memory disk unit 100 through the controller unit 300.

The backup storage unit 600A-B is configured as a low speed non-volatile storage device such as a hard disk and stores data of the SSD memory disk unit 100.

The backup control unit 700 backs up data stored in the SSD memory disk unit 100 in the backup storage unit 600A-B by controlling the data input/output of the backup storage unit 600A-B and backs up the data stored in the SSD memory disk unit 100 in the backup storage unit 600A-B according to an instruction from the host, or when an error occurs in the power source of the host due to a deviation of the power transmitted from the host deviates from the threshold value.

The storage device of a serial-attached small computer system interface/serial advanced technology attachment (PCI-Express) type supports a low speed data processing speed for a host by adjusting synchronization of a data signal transmitted/received between the host and a memory disk during data communications between the host and the memory disk through a PCI-Express interface, and simultaneously supports a high speed data processing speed for the memory disk, thereby supporting the performance of the memory to enable high speed data processing in an existing interface environment at the maximum.

While the exemplary embodiments have been shown and described, it will be understood by those skilled in the art that various changes in form and details may be made thereto without departing from the spirit and scope of this disclosure as defined by the appended claims. In addition, many modifications can be made to adapt a particular situation or material to the teachings of this disclosure without departing from the essential scope thereof. Therefore, it is intended that this disclosure not be limited to the particular exemplary embodiments disclosed as the best mode contemplated for carrying out this disclosure, but that this disclosure will include all embodiments falling within the scope of the appended claims.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. An adaptive cache system for a hybrid storage system, comprising:
  an input/out (I/O) traffic analysis component for monitoring data traffic and providing a traffic analysis based thereon;

an adaptive cache algorithm component coupled to the I/O traffic analysis component for applying a set of algorithms to a storage schema for handling the data traffic;

an adaptive cache policy component coupled to the adaptive cache algorithm component for applying a set of caching policies and making storage determinations based on the traffic analysis and the storage schema;

a low-mid-high cache coupled to the adaptive cache policy component for storing the data traffic based on the storage determinations;

a high speed storage component coupled to the low-mid-high cache;

a middle speed storage component coupled to the low-mid-high cache; and a low speed storage component coupled to the low-mid-high cache;

wherein the high speed storage component is directly connected with the middle speed storage component by a first logical data path, and the high speed storage component is directly connected with the low speed storage component by a second logical data path;

wherein the high speed storage component comprises:

a cache area directly connected with the low-mid-high-cache;

a high speed storage area; and a storage manager for controlling the cache area and the high speed storage area; and wherein the high speed storage component is configured such that the low-mid-high cache is connected with a first data input/output (I/O), the high speed storage area is connected with a second data input/output (I/O), and the cache area is directly connected to both the low-mid-high cache and the high speed storage area, such that the cache area and the high speed storage area each independently accesses data external to the adaptive cache system, and such that the storage manager controls the cache area and the high speed storage area based on a usage pattern, file context, a hit-rate, or a storage area request to increase cache usage or to reduce data access time.

2. The adaptive cache system of claim 1, the low speed storage component comprising at least one of the following: a high density drive, or flash memory.

3. The adaptive cache system of claim 1, the middle speed storage comprising at least one of the following: parameter random access memory, ferroelectric random access memory, magnetoresistive random access memory, or a semiconductor storage device.

4. The adaptive cache system of claim 1, the high speed storage component comprising a dynamic random access memory semiconductor storage device.

5. The adaptive cache system of claim 1, further comprising a cache manager for managing the adaptive cache system.

6. An adaptive cache system for a hybrid storage system, comprising:

an input/out (I/O) traffic analysis component for monitoring data traffic and providing a traffic analysis based thereon;

an adaptive cache algorithm component coupled to the I/O traffic analysis component for applying a set of algorithms to determine a storage schema for handling the data traffic;

an adaptive cache policy component coupled to the adaptive cache algorithm component for applying a set of caching policies and making storage determinations based on the traffic analysis and the storage schema;

a low-mid-high cache coupled to the adaptive cache policy component for storing the data traffic based on the storage determinations;

a low speed storage component coupled to the low-mid-high cache;

a high speed storage component coupled to the low-mid-high cache, the high speed storage component comprising a cache area directly connected with the low-mid-high-cache, a high speed storage area, and a storage manager for controlling the cache area and the high speed storage area;

a middle speed storage component coupled to the low-mid-high cache; and wherein the high speed storage component is directly connected with the middle speed storage component by a first logical data path, and the high speed storage component is directly connected with the low speed storage component by a second logical data path; and wherein the high speed storage component is configured such that the low-mid-high cache is connected with a first data input/output (I/O) and the high speed storage area is connected with a second data input/output (I/O) such that the cache area and the high speed storage area each independently accesses data external to the adaptive cache system, and such that the storage manager controls the cache area and the high speed storage area based on a usage pattern, file context, hit-rate, or a storage area request to increase cache usage or to reduce data access time.

7. The adaptive cache system of claim 6, the low speed storage component comprising at least one of the following: a high density drive, or flash memory.

8. The adaptive cache system of claim 6, wherein the middle speed storage comprises at least one of the following: parameter random access memory, ferroelectric random access memory, magnetoresistive random access memory, or a semiconductor storage device.

9. A method for forming an adaptive cache system for a hybrid storage system, comprising:

providing an input/out (I/O) traffic analysis component for monitoring data traffic and providing a traffic analysis based thereon;

coupling an adaptive cache algorithm component for applying a set of algorithms to determine a storage schema for handling data traffic to the I/O traffic analysis component;

coupling an adaptive cache policy component to the adaptive cache algorithm component for applying a set of caching policies and making storage determinations based on the traffic analysis and the storage schema;

coupling a low-mid-high cache to the adaptive cache policy component for storing the data traffic based on the storage determinations;

coupling a low speed storage component to the low-mid-high cache;

coupling a high speed storage component to the low-mid-high cache, the high speed storage component comprising a cache area directly connected with the low-mid-high-cache, a high speed storage area, and a storage manager for controlling the cache area and the high speed storage area; and coupling a middle speed storage component to the low-mid-high cache;

wherein the high speed storage component is directly connected with the middle speed storage component by a first logical data path, and the high speed storage component is directly connected with the low speed storage component by a second logical data path; and wherein the high speed storage component is configured such that the low-mid-high cache is connected with a first data input/output (I/O) and the high speed storage area is connected with a second data input/output (I/O) such that the cache area and the high speed storage area each independently accesses data external to the adaptive cache system, and such that the storage manager controls the cache area and the high speed storage area based on a usage pattern, file context, a hit-rate, or a storage area request to increase cache usage or to reduce data access time.

10. The method of claim 9, the low speed storage component comprising at least one of the following: a high density drive, or flash memory.

11. The method of claim 9, the middle speed storage comprising at least one of the following: parameter random access memory, ferroelectric random access memory, magnetoresistive random access memory, or a semiconductor storage device.

12. The method of claim 9, the low speed storage component comprising at least one of the following: a high density drive, or flash memory.

13. The method of claim 9, the high speed storage component comprising a dynamic random access memory semiconductor storage device.

14. The method of claim 9, further comprising a cache manager for managing the adaptive cache system.

15. The method of claim 9, the high speed storage component being configured to handle multiple I/O data paths.

\* \* \* \* \*